United States Patent [19]

Seo et al.

[11] Patent Number: 5,552,178

[45] Date of Patent: Sep. 3, 1996

[54] METHOD FOR PREPARING ANTI-REFLECTIVE COATING FOR DISPLAY DEVICES

[75] Inventors: Kang-Il Seo, Seoul; Dong-Sik Jang, Kyungki-Do; Heon-Soo Kim, Seoul; Su-Min Jeong, Kyungki-Do, all of Rep. of Korea

[73] Assignee: Samsung Display Devices Co., Ltd., Kyungki-Do, Rep. of Korea

[21] Appl. No.: 187,712

[22] Filed: Jan. 28, 1994

[30] Foreign Application Priority Data

Aug. 5, 1993 [KR] Rep. of Korea .................. 1993-15225

[51] Int. Cl.$^6$ ...................................................... B05D 5/06
[52] U.S. Cl. ........................... 427/64; 427/68; 427/108; 427/126.2; 427/126.3; 427/162; 427/165; 427/226; 427/419.3; 427/419.8
[58] Field of Search .................................... 427/226, 229, 427/165, 162, 64, 68, 419.8, 126.2, 126.3, 108, 419.3

[56] References Cited

U.S. PATENT DOCUMENTS

| | | | |
|---|---|---|---|
| 4,361,598 | 11/1982 | Yoldas | 427/162 |
| 4,945,282 | 7/1990 | Kawamura et al. | 313/479 |
| 4,966,812 | 10/1990 | Ashley et al. | 427/161 |
| 5,019,293 | 5/1991 | Burlitch | 252/313.1 |
| 5,153,031 | 10/1992 | Burlitch | 427/226 |
| 5,156,884 | 10/1992 | Tunitsu et al. | 427/226 |
| 5,219,611 | 6/1993 | Giannelis | 427/126.1 |

FOREIGN PATENT DOCUMENTS

| | | |
|---|---|---|
| 61-118932 | 6/1986 | Japan . |
| 6476001 | 3/1989 | Japan . |

*Primary Examiner*—Janyce Bell
*Attorney, Agent, or Firm*—Leydig, Voit & Mayer

[57] ABSTRACT

A method for preparing an anti-reflective coating is provided which comprises the steps of applying a first coating composition containing an alcohol solution of a silicon alkoxide, at least one metal alkoxide of the formula $M(OR)_4$, an acid and water, where M is a metal selected from the group consisting of Ti, Sn, In and Zr and R is an alkyl group, on the outer surface of a panel to form a first layer; drying the panel at about 40°–80° C. to form a first layer; applying a second coating composition containing an alcohol solution of a silicon alkoxide, a salt selected from the group consisting of KCl, $KNO_3$, $CH_3COOK$, NaCl, $NaNO_3$, $CH_3COONa$, $NH_4Cl$, $NH_4NO_3$ and $CH_3COONH_4$, an acid and water onto the first layer to form a second layer; and heating the first and second layers coated on the outer surface of a panel.

17 Claims, 5 Drawing Sheets

METHOD FOR PREPARING ANTI-REFLECTIVE COATING FOR DISPLAY DEVICES

BACKGROUND OF THE INVENTION

The present invention relates to a method for preparing a multi-layer coating having anti-reflective properties on the outer surface of an image display device, such as a cathode ray tube (CRT), a liquid crystal display (LCD), etc.

Transparent panels for the display screens of image display devices, such as a CRT or LCD, are made of glasses or plastics, which strongly reflect external light, making it difficult to view images formed thereon. Especially, display devices constituted with various CRTs are used in terminals of computer systems so that increased importance should be placed on such anti-reflective properties.

In order to prevent the surface of the display panels from reflecting external light, the glassy surface of the panel is etched with chemical reagents, such as silicofluoric acid ($H_2SiF_6$), or with sandblasting process to form minute irregularities, thereby imparting a non-glare property. However, these methods are disadvantageous in that such a chemical treatment creates minute irregularities which are weakened and thus subject to being crushed easily and that direct damage to the screens makes their regeneration impossible.

In recent years, an alcohol solution containing $Si(OR)_4$ has been spray-coated on the outer surface of the panel to form numerous fine irregularities. Japanese Patent Laid-open Publication No. sho 61-118932 discloses a cathode ray tube having an antistatic and non-glare coating in which an alcohol solution of $Si(OR)_4$ is spray-coated on the outer surface of a panel and heated at 150° C. or less, to form a $SiO_2$ film with silanol groups. Since the heating temperature is relatively low, some silanol groups remain in the siloxane structure, and the hygroscopic nature of the -OH group endows the film with antistatic properties. The method is advantageous in that the coating is easily prepared and regeneration is possible, but has the problem of low resolution.

Japanese Patent Laid-open Publication No. sho 64-76001 discloses a non-glare coating which is prepared by spray-coating an alcohol solution of $Si(OR)_4$ containing $MgF_2$ particles of an average particle size of 0.01–1 μm dispersed therein on the surface of the glass, and heating the resulting coat to form a $SiO_2$ film which fixes fine $MgF_2$ particles and forms numerous projections on the surface of the panel.

U.S. Pat. No. 4,949,282 discloses a process for producing image display panels, which comprises the steps of dispersing fine $SiO_2$ particles of 100–10,000 Å in diameter in an alcoholic solution of $Si(OR)_4$ and dispersing particles of electroconductive metal oxides and/or hygroscopic metal salts, applying the resulting suspension onto the panel surface, heating the resulting coat to decompose the $Si(OR)_4$, and forming a thin $SiO_2$ film to coat fine $SiO_2$ particles and the additive particles in order to fix them on the surface of the panel. FIG. 1A shows an enlarged sectional view of this antistatic coat having non-glare function formed on the outer surface of the panel (1). The $SiO_2$ film (2) has a non-glare function due to the $SiO_2$ particles (3) as well as an antistatic function. However, according to the method of spraying an alcoholic suspension of $Si(OR)_4$ containing fine particles and fixing them on the outer surface of the panel, the diffusion effect due to the fine particles decreases the degree of resolution.

Generally, anti-reflective coating requires more than two layers, and typically four layers, in order to get a wider range of wavelengths having low reflectance. According to the method of spraying an alcoholic solution of $Si(OR)_4$, the sprayed liquid particles are deposited more thickly when approaching toward the edge of the glass panel face, so a uniform layer throughout the glass surface is difficult to obtain. Such a problem of uneven coating has become serious as the number of coated layers increases, so multiple layers are hard to produce by the spraying method.

Recently, a vacuum deposition, sputtering, or CVD (chemical vapor deposition) method is also used to form multiple layers of conductive metals on the outer surface of the panel so that the antistatic and anti-reflective properties are provided. FIG.1B is an enlarged sectional view of an example of multiple deposition layers which is composed of $MgF_2$ layers ($4a,4b$) and $TiO_2+Pr_6O_{11}$ layers ($5a,5b$). These layers are formed by alternately depositing $MgF_2$ of a given refractive index ($n_1$=1.38) and $TiO_2+Pr_6O_{11}$ of a given refractive index ($n_2$=2.06). Such multiple deposition layers have an advantage of low reflectance (below 0.1), but these methods involve significant problems. That is, these methods require a large-scale apparatus, and further, many operation steps and high production costs are required in order to produce a large-scale display tube.

SUMMARY OF THE INVENTION

The object of the present invention is to overcome the above-described disadvantages of the conventional antistatic and non-glare coating by providing a method for preparing an anti-reflective coating for a display device having low reflectance through a wide range of wavelengths, not by an expensive deposition method, but by a simple low-cost process.

According to the present invention, there is provided a method for preparing an anti-reflective coating which comprises the steps of:

applying a first coating composition containing an alcohol solution of a silicon alkoxide, a metal alkoxide, an acid and water onto the outer surface of a panel to form a first layer;

applying a second coating composition containing an alcohol solution of a silicon alkoxide, a metal salt, an acid and water onto the first layer to form a second layer; and heating the resulting two layers coated on the outer surface of a panel.

The first coating composition contains a metal alkoxide $\{M(OR)_x$, where M is a metal and R is an alkyl group having 1 to 4 carbon atoms$\}$ which is hydrolyzed, along with a silicon alkoxide, by an acid and water. Due to the metal alkoxide the first coating has a high refractive index on the surface of the panel. On the first layer, the second layer of a low refractive index is formed by hydrolyzing the silicon alkoxide. In addition, a metal salt is added to the silicon alkoxide solution of a low refractive index in order to form minute irregularities on the surface of the outer layer. Thus, the anti-reflective coating prepared by the present invention, which comprises a first layer of a high refractive index due to a metal alkoxide, a second layer of a low refractive index due to a silicon alkoxide, and minute irregularities due to a metal salt, has a low reflectance through a much wider range of wavelengths than any other conventional optical material.

Further, the amount of the metal salt added to the outermost layer to form irregularities may be controlled in order to regulate the content of the reflection of external light.

The metal alkoxide of the present invention, $M(OR)_x$, may be at least one of those having a high refractive index, such as $Ti(OR)_4$, $Sn(OR)_4$, or $Zr(OR)_4$. The amount of the metal alkoxide used is preferably in the range of 0.1 to 5% by weight of the first coating composition.

The metal salt of the present invention may be at least one of those forming minute irregularities, such as KCl, $KNO_3$, $CH_3COOK$, NaCl, $NANO_3$, $CH_3COONa$, $NH_4Cl$, $NH_4NO_3$ or $CH_3COONH_4$. The amount of the metal salt used is preferably in the range of 0.01 to 2% by weight of the second coating composition.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

The present invention will be described in detail with reference to the following drawings and examples.

Figure 1A:
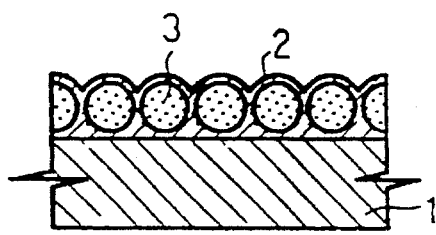
FIG. 1A is an enlarged sectional view of an antistatic coat having non-glare function formed according to a prior art method.
Figure 1B:
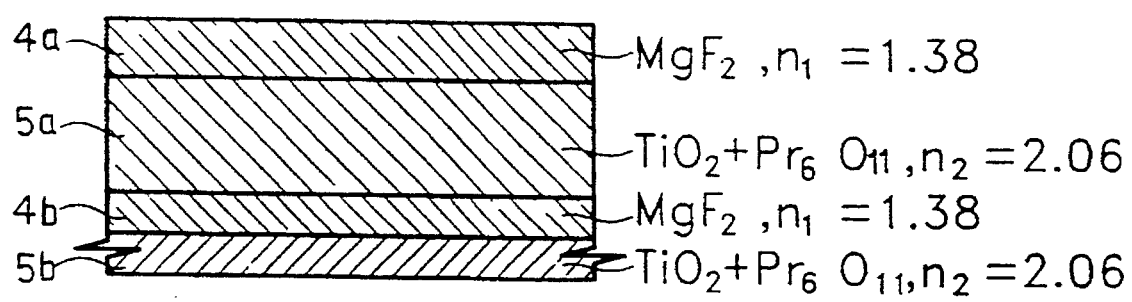
FIG. 1B is an enlarged sectional view of an example of multiple deposition layers formed according to a prior art method.
Figure 2A:
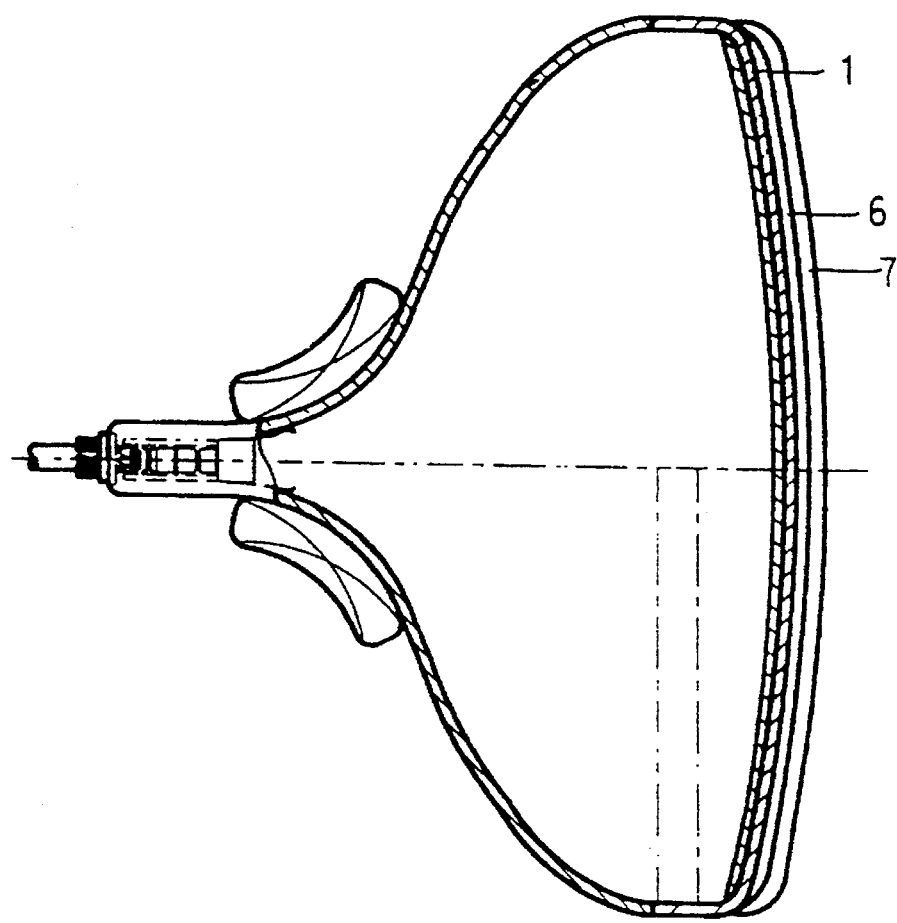
FIG. 2A is a schematic sectional view of a CRT having an anti-reflective coating prepared according to an embodiment of the present invention.
Figure 2B:
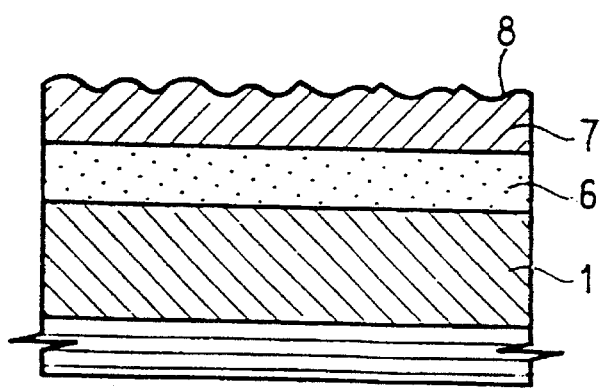
FIG. 2B is an enlarged sectional view of an anti-reflective coating formed according to an embodiment of the present invention.

FIG. 2A is a schematic sectional view of a cathode ray tube on which an anti-reflective coating is prepared according to an embodiment of the present invention, and FIG. 2B is an enlarged sectional view of an anti-reflective coating formed according to an embodiment of the present invention. As shown in these figures, the high refractive layer (6) due to a metal alkoxide and the low refractive layer (7) due to a silicon alkoxide are coated successively on the outer surface of a panel (1) of a CRT. Also, minute irregularities (8) due to a metal salt are formed on the outer surface of the low refractive layer (7).

Figure 3A:
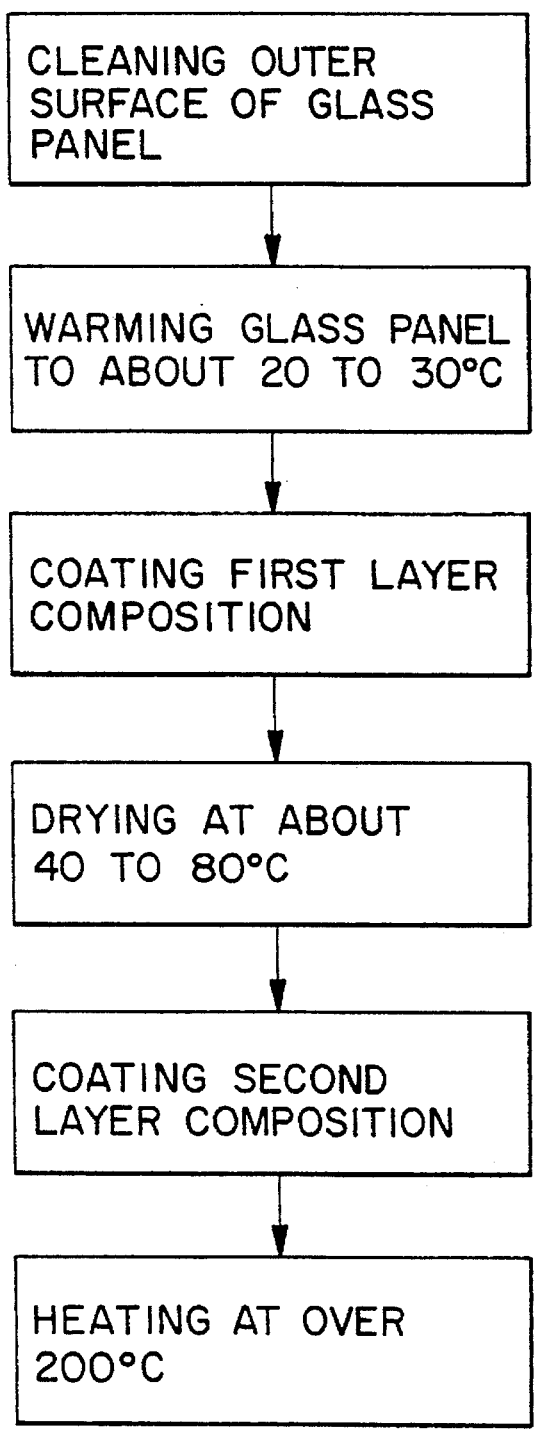
FIG. 3A is a flow chart diagram of the process of the present invention.
Figure 3B:
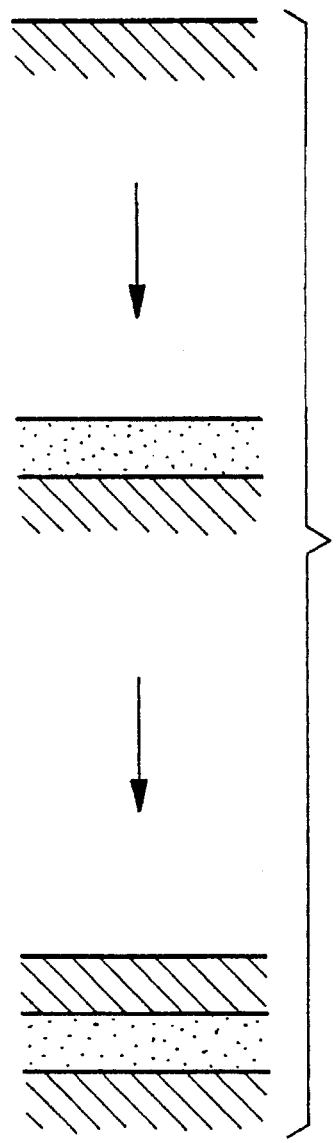
FIG. 3B shows enlarged sectional views of sequential layers formed, which correspond to the steps shown in FIG. 3A.

FIG. 3A is a flow chart diagram of the process of the present invention, while FIG. 3B shows the layers in section corresponding thereto. Referring to FIG. 3, the process for preparing the anti-reflective coating of the present invention will be described in detail.

Prior to starting the coating process, the outer surface of a glass panel is cleaned by any of the known methods used to remove surface impurities, such as dirt, oil, etc.

Then, the cleaned glass panel is warmed to about 20° to 30° C.

The first coating composition is prepared by dispersing a metal alkoxide in an alcohol solution of a silicon alkoxide, adding an acid catalyst and water to the alcohol suspension to hydrolyze the metal alkoxide along with silicon alkoxide. The hydrolyzed suspension is applied to the outer surface of the warmed panel, and the coated layer is dried at about 40° to 80° C. to form a first layer.

The metal alkoxide, $M(OR)_x$, may be selected from among those which have a high refractive index, such as $Ti(OR)_4$, $Sn(OR)_4$ or $Zr(OR)_4$. The metal alkoxide is preferably used in the range of 0.1 to 5% by weight of the first coating composition. The acid of the coating composition may be selected from a nitric acid, hydrochloric acid, acetic acid or phosphoric acid, and is added in an amount which promotes the hydrolysis of the alkylsilicate. The alcohol may be selected from a methanol, ethanol, isopropanol, butanol, or mixtures thereof. One embodiment of the alcohol mixture contains methyl, ethyl, isopropyl and butyl alcohols. The coating suspension is applied to the panel by spin-coating, spray-coating or dipping, and preferably spin-coating.

The second coating composition is prepared by dispersing a metal salt in an alcohol solution of silicon alkoxide, adding an acid catalyst and water to the alcohol suspension to hydrolyze the silicon alkoxide. The hydrolyzed suspension is applied, preferably by spin-coating, to the first layer, and the coated layer is heated at over 200° C. to form a second layer.

The metal salt may be at least one of those forming minute irregularities, such as KCl, $KNO_3$, $CH_3COOK$, NaCl, $NaNO_3$, $CH_3COONa$, $NH_4Cl$, $NH_4NO_3$ or $CH_3COONH_4$. The metal salt is preferably used in the range of 0.01 to 2% by weight of the second coating composition.

Figure 4A:
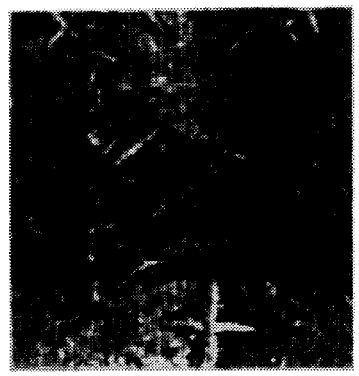
FIGS. 4A, 4B and 4C are photographs (200×) of the magnified outer surfaces of the anti-reflective coating formed according to embodiments of the present invention.
Figure 4B:
Figure 4C:
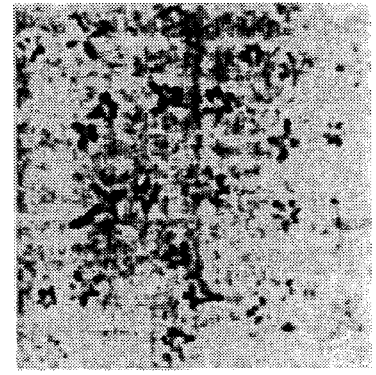

FIGS. 4A, 4B and 4C are photographs (200×) of the magnified outer surfaces of the anti-reflective coating formed according to an embodiment of the present invention. FIG. 4A shows the surface of the coating formed using 0.5% by weight of $NH_4Cl$ as a metal salt, FIG. 4B is the case of 0.4% by weight of $NH_4Cl$, and FIG. 4C is the case of 0.2% by weight of $NH_4Cl$. As shown in these figures, the irregularities of the surface varies with the amount of the metal salt added to the second coating composition, so the reflection of external light may be controlled according to its intensity.

Further, as the metal alkoxide of the present invention, an alkoxide of a conductive metal, such as Sn or In, is preferably used, since it endows the coating layers of the present invention with an antistatic property as well as an anti-reflective property. Of course, the alkoxide of a conductive metal may be added in addition to an ordinary metal alkoxide.

The present invention will be described in detail by way of the following examples which are merely representative and illustrative of the present invention but are in no way to be considered as limiting the invention to the specific examples.

EXAMPLE 1

The first coating composition was prepared by dispersing a titanium n-butoxide into a solution formed from an alcohol mixture of methyl, ethyl, isopropyl and butyl alcohols and tetraethylorthosilicate, and adding nitric acid and water to the alcohol suspension in the following ratio:

| | |
|---|---|
| titanium n-butoxide | 1% by weight |
| tetraethylorthosilicate | 1% by weight |
| mixed alcohol solvent | 93% by weight |
| water | less than 5% by weight |
| nitric acid | minimum quantity |

The outer surface of a glass panel of a display device was cleaned and warmed to about 20° to 30° C. Then the first coating composition prepared as above was spin-coated on the outer surface of the warmed panel, and the coated layer is dried at about 40° to 80° C. to form a first layer.

The second coating composition was prepared as following ratio:

| | |
|---|---|
| ammonium chloride | 0.2% by weight |
| tetraethylorthosilicate | 2% by weight |
| mixed alcohol solvent | 92% by weight |
| water | less than 5% by weight |
| nitric acid | minimum quantity |

A tetraethylorthosilicate, water and nitric acid solution was added to an alcohol mixture of methyl, ethyl, isopropyl and butyl alcohols, and the resulting alcohol solution was placed in water bath at 60° C. for 36 to 72 hours. An ammonium chloride was dissolved in water and the solution was added to the alcohol solution of ethylsilicate. Then, the resulting alcohol dispersion was stirred for one to two hours to obtain the second coating composition. The second coating composition was applied onto the first layer by spin-coating to form a second layer. The panel was heated at over 200° C. to form a multi-coating layer having an anti-reflective property of the present invention.

EXAMPLE 2

The same procedure as in Example 1 was repeated to form a multi-layered anti-reflective coating, except that $NH_4NO_3$ was used instead of $NH_4Cl$ in the second coating composition.

EXAMPLE 3

The same procedure as in Example 1 was repeated except that $CH_3COONa$ was used instead of $NH_4Cl$ in the second coating composition.

EXAMPLE 4

The first coating composition was prepared by dispersing a titanium n-butoxide and tin tert-butoxide to a mixed alcohol solution of a tetraethylorthosilicate of the kind used in Example 1, adding nitric acid and water to the alcohol suspension in the following ratio:

| | |
|---|---|
| titanium n-butoxide | 0.5% by weight |
| tin tert-butoxide | 0.5% by weight |
| tetraethylorthosilicate | 1% by weight |
| mixed alcohol solvent | 93% by weight |
| water | less than 5% by weight |
| nitric acid | minimum quantity |

The outer surface of a glass panel of a display device was cleaned and warmed to about 20° to 30° C. Then the first coating composition prepared as above was spin-coated on the outer surface of the warmed panel, and the coated layer was dried at about 40° to 80° C. to form a first layer.

The second coating composition was prepared in the following proportions:

| | |
|---|---|
| sodium chloride | 0.2% by weight |
| tetraethylorthosilicate | 2% by weight |
| mixed alcohol solvent | 92% by weight |
| water | less than 5% by weight |
| nitric acid | minimum quantity |

A tetraethylorthosilicate, water and nitric acid were added to a mixed alcohol of the type used in Example 1, and the resulting alcohol solution was placed in water bath at 60° C. for 36 to 72 hours. The sodium chloride was dissolved in water and the solution was: added to the alcohol solution of ethylsilicate. Then, the resulting alcohol dispersion was stirred for one to two hours to obtain the second coating composition. The second coating composition was applied on the first layer by spin-coating to form a second layer. The panel was heated at over 200° C. to form a multi-coating layer having the anti-reflective property of the present invention.

EXAMPLE 5

The same procedure as in Example 4 was repeated except that $NaNO_3$ was used instead of NaCl in the second coating composition.

EXAMPLE 6

The same procedure as in Example 4 was repeated except that $CH_3COOK$ was used instead of NaCl in the second coating composition.

The multi-layered anti-reflective coatings manufactured in Examples 1 to 6 exhibit a low reflectance throughout a wide range of wavelengths. Especially, the coatings of Examples 4 to 6 contain an oxide of a conductive metal, Sn, which comes from tin tert-butoxide, so they impart excellent antistatic properties as well as anti-reflective properties.

Figure 5:
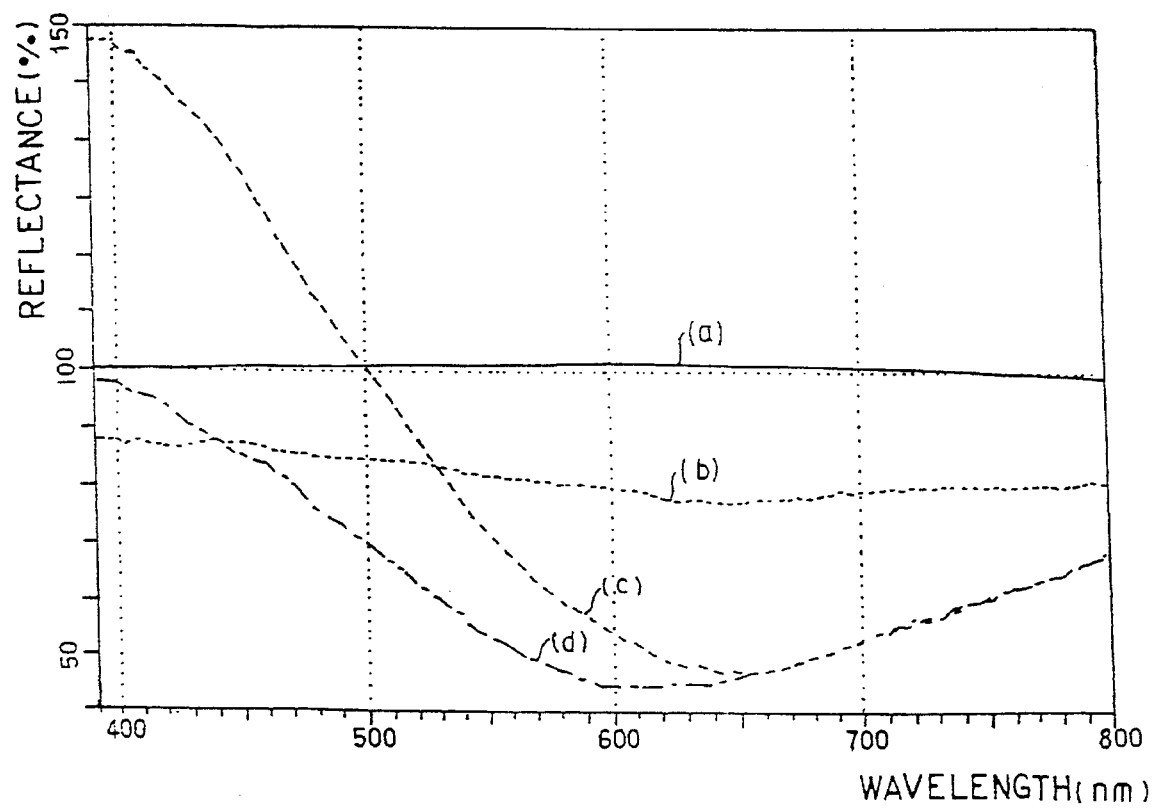
FIG. 5 is a graph showing the relationship between the reflectance and the wavelength, i.e., the reflectance curves of various panels.

FIG.5 is a graph showing the relationship between the reflectance and the wavelength, i.e., the reflectance curves of various panels. Curve (a) represents the reflectance curve of a panel without non-glare coating; curve (b) is that of a panel having a single-layered non-glare coating containing a metal salt; curve (c) is that of a panel having a two-layered non-glare coating; and curve (d) is that of a panel having double-layered anti-reflective coating with a metal salt in the upper layer according to the present invention. As shown in FIG.5, curve (d), shows a lower reflectance through a wider range of wavelengths than any other case. As described above, the anti-reflective coating manufactured according to the present invention has the following advantages:

1) Due to a high refractive layer, a low refractive layer and minute irregularities formed on the surface of the low refractive layer, the anti-reflective coating exhibits low reflectance spectral characteristics throughout a wide range of wavelengths;
2) The reflectance of external light due to the anti-reflective coating may be controlled by changing the amount of metal salt added to the low refractive layer, without changing the manufacturing procedure;
3) The minute irregularities of the surface may be formed easily by way of a simple spin-coating procedure, without separate spray-coating facilities, and endows the anti-reflective coating with light diffusion properties; and 4) The thickness of the formed anti-reflective coating is easy to control.

The anti-reflective coating according to the present invention having the above advantages may be applied to not only CRTs but also other image display devices, such as, LCD and has the same effect thereon.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for preparing an anti-reflective coating which comprises the steps of:

applying a first coating composition containing an alcohol solution of a silicon alkoxide, at least one metal alkoxide of the formula $M(OR)_4$, an acid and water, where M is a metal selected from the group consisting of Ti, Sn, In and Zr and R is an alkyl group, on the outer surface of a panel to form a first layer;

drying said panel at about 40°–80° C. to form a first layer;

applying a second coating composition containing an alcohol solution of a silicon alkoxide, a salt selected from the group consisting of KCl, $KNO_3$, $CH_3COOK$, NaCl, $NaNO_3$, $CH_3COONa$, $NH_4Cl$, $NH_4NO_3$ and $CH_3COONH_4$, an acid and water onto the first layer to form a second layer; and heating the first and second layers coated on the outer surface of a panel.

2. A method as claimed in claim 1, wherein said metal alkoxide is at least one selected from the group consisting of $Ti(OR)_4$, $Sn(OR)4$ and $Zr(OR)_4$.

3. A method as claimed in claim 1, wherein said metal alkoxide is added in the range of 0.1 to 5% by weight of the first coating composition.

4. A method as claimed in claim 2, wherein said metal alkoxide is added in the range of 0.1 to 5% by weight of the first coating composition.

5. A method as claimed in claim 1, wherein said metal salt is added in the range of 0.01 to 2% by weight of the second coating composition.

6. A method as claimed in claim 1, wherein said metal salt is added in the range of 0.01 to 2% by weight of the second coating composition.

7. A method as claimed in claim 1, wherein said first coating composition is applied by spin coating.

8. A method as claimed in claim 1, wherein said second coating composition is applied by spin coating.

9. A method as claimed in claim 7, wherein said second coating composition is applied by spin coating.

10. A method as claimed in claim 1, wherein said metal alkoxide is at least one selected from the group consisting of Sn and In.

11. A method as claimed in claim 1, wherein said first layer has a higher refractive index than said second layer.

12. A method as claimed in claim 1, wherein said silicon alkoxide is tetraethylorthosilicate.

13. A method as claimed in claim 1, wherein said acid is nitric acid.

14. A method as claimed in claim 1, wherein said metal alkoxide is at least one of titanium n-butoxide, tin tert-butoxide and mixtures thereof.

15. A method as claimed in claim 1, wherein said alcohol solution is a member selected from the group consisting of methanol, ethanol, isopropanol, butanol or mixtures thereof.

16. A method as claimed in claim 1, wherein said alcohol solution comprises a mixture of methanol, ethanol, isopropanol and butanol.

17. A method as claimed in claim 1 wherein said panel is heated to from about 40° to about 80° C. after said first coating composition is applied to the outer surface and said panel.

\* \* \* \* \*